United States Patent
Knox

(10) Patent No.: US 11,516,545 B1
(45) Date of Patent: Nov. 29, 2022

(54) OPTIMIZATION TOOLS AND TECHNIQUES FOR AUDIO AND AUDIOVISUAL CONTENT

(71) Applicant: AKM Productions Inc., Valencia, PA (US)

(72) Inventor: Andrew Knox, Valencia, PA (US)

( * ) Notice: Subject to any disclaimer, the term of this patent is extended or adjusted under 35 U.S.C. 154(b) by 0 days.

(21) Appl. No.: 16/939,187

(22) Filed: Jul. 27, 2020

Related U.S. Application Data

(60) Provisional application No. 62/878,853, filed on Jul. 26, 2019.

(51) Int. Cl.
| | |
|---|---|
| *H04N 21/439* | (2011.01) |
| *H04N 21/472* | (2011.01) |
| *H04N 21/485* | (2011.01) |
| *H04N 21/44* | (2011.01) |
| *H04N 21/45* | (2011.01) |

(52) U.S. Cl.
CPC ..... *H04N 21/47205* (2013.01); *H04N 21/439* (2013.01); *H04N 21/44* (2013.01); *H04N 21/4532* (2013.01); *H04N 21/4852* (2013.01)

(58) Field of Classification Search
None
See application file for complete search history.

(56) References Cited

U.S. PATENT DOCUMENTS

| | | | |
|---|---|---|---|
| 8,531,602 B1* | 9/2013 | Tudor | G11B 27/28 348/485 |
| 2007/0039034 A1* | 2/2007 | Sokol | H04N 21/233 725/117 |
| 2015/0382096 A1* | 12/2015 | Lamar | H04R 1/1083 381/74 |
| 2017/0188106 A1* | 6/2017 | Harb | H04N 21/44029 |
| 2017/0220383 A1* | 8/2017 | Raj | G06F 9/4881 |

* cited by examiner

*Primary Examiner* — Jefferey F Harold
*Assistant Examiner* — Charles N Hicks
(74) *Attorney, Agent, or Firm* — Michael D. Lazzara; Leech Tishman Fuscaldo & Lampl

(57) ABSTRACT

A system is provided for modifying media content, including remastering audio or video components of the content. The system may include an application programming interface programmed for communicating selected mastering profiles to a user interface; applying the mastering profiles to uploaded original media content files; separating the uploaded media content files into their audio and video component portions; applying the selected mastering profiles to at least the audio component portion to generate a remastered audio component portion; and, combining the video component portions with the remastered audio component portions to generate modified media content files. The system may also include a user interface programmed for selecting original media content files for electronic upload from an access device; displaying multiple available mastering profiles in connection with the selected media content files; and receiving and previewing the modified media content files.

18 Claims, 28 Drawing Sheets

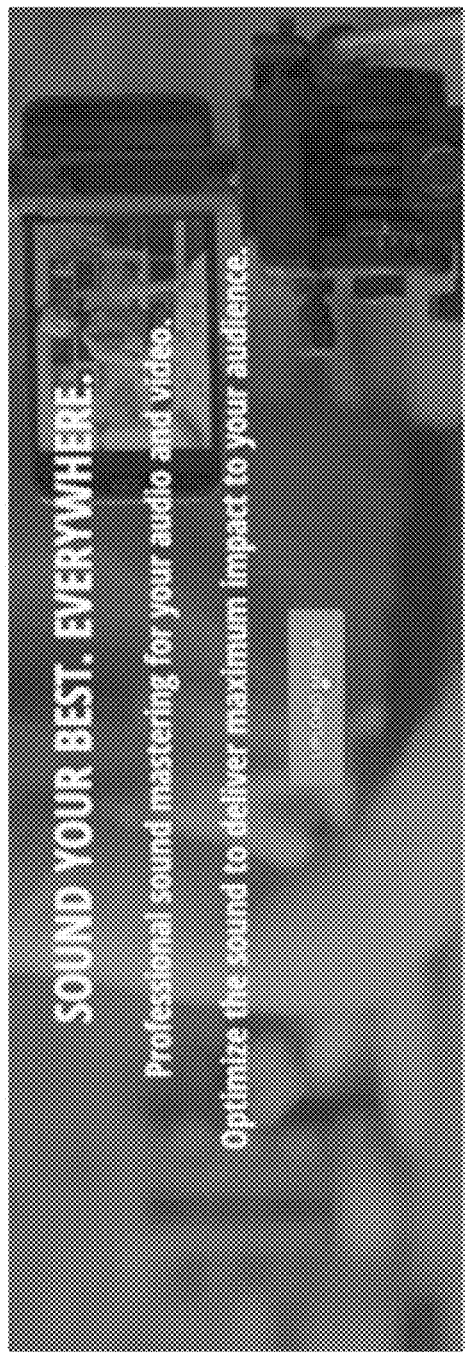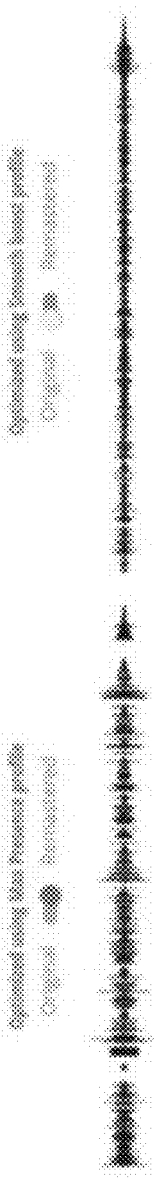
FIG. 15

OPTIMIZATION TOOLS AND TECHNIQUES FOR AUDIO AND AUDIOVISUAL CONTENT

CROSS-REFERENCE TO RELATED APPLICATION

The present non-provisional patent application claims the priority benefit of U.S. Provisional Patent Application Ser. No. 62/878,853, filed on Jul. 26, 2019, the entirety of which is hereby incorporated by reference into the present application.

FIELD OF THE INVENTION

Various embodiments of the present invention generally relate to systems, processes, devices, and techniques for modifying, enhancing, or optimizing audio, video, and audiovisual content. In certain embodiments, the invention relates to mastering or adjusting parameters for audio signals associated with certain video or audiovisual content.

BACKGROUND

Audio quality is an important component of content in a wide spectrum of applications arising in many different commercial enterprises, including companies in industries such as medical, entertainment, education, and business, among others. Audio quality can vary dramatically based on the type of device used to play the content, for example, such as computers, mobile phones, laptops, radios, vehicle sound systems, and other types of devices. In addition, audio quality often depends and varies based on the distribution channel through which it is communicated, such as through social media networks, professional networks, Internet, television, radio, or other channels. For example, sound volume for content viewed on the Internet (e.g., a "YouTube" video) can vary drastically from video to video, usually requiring the viewer to frequently and inconveniently adjust the volume up or down accordingly. In another example, volume for television programs can vary from program to program, or from commercial to commercial, likewise requiring the viewer to manually adjust settings on the television or computer to accommodate volume level differences. Also, another important factor to consider is the environment in which audio is experienced by the listener. For example, the acoustics of a room or other physical space occupied by the listener can significantly impact how the audio content is perceived.

In view of these issues, improved computer-based tools, techniques and solutions are needed which can more effectively and efficiently enhance or optimize audio content, including audio content associated with a video or other audiovisual content.

BRIEF DESCRIPTION OF THE FIGURES

FIGS. 15-24 include a series of screen displays illustrating examples of different aspects of the operation and processing performed by a media content mastering platform configured in accordance with certain embodiments of the invention.

DESCRIPTION

In developing different aspects of the invention, the inventor has created a solution which provides a web-based platform that enables processing, analysis, and enhancement of different components of many types of media content, including audio, video, and audiovisual content. The solution may employ a variety of mastering profiles, for example, which can be applied to selected media content files to adjust one or more sound parameters (e.g., volume) or other attributes associated with the content. These tools can be used to optimize media content for a variety of different commercial applications.

Figure 1A:
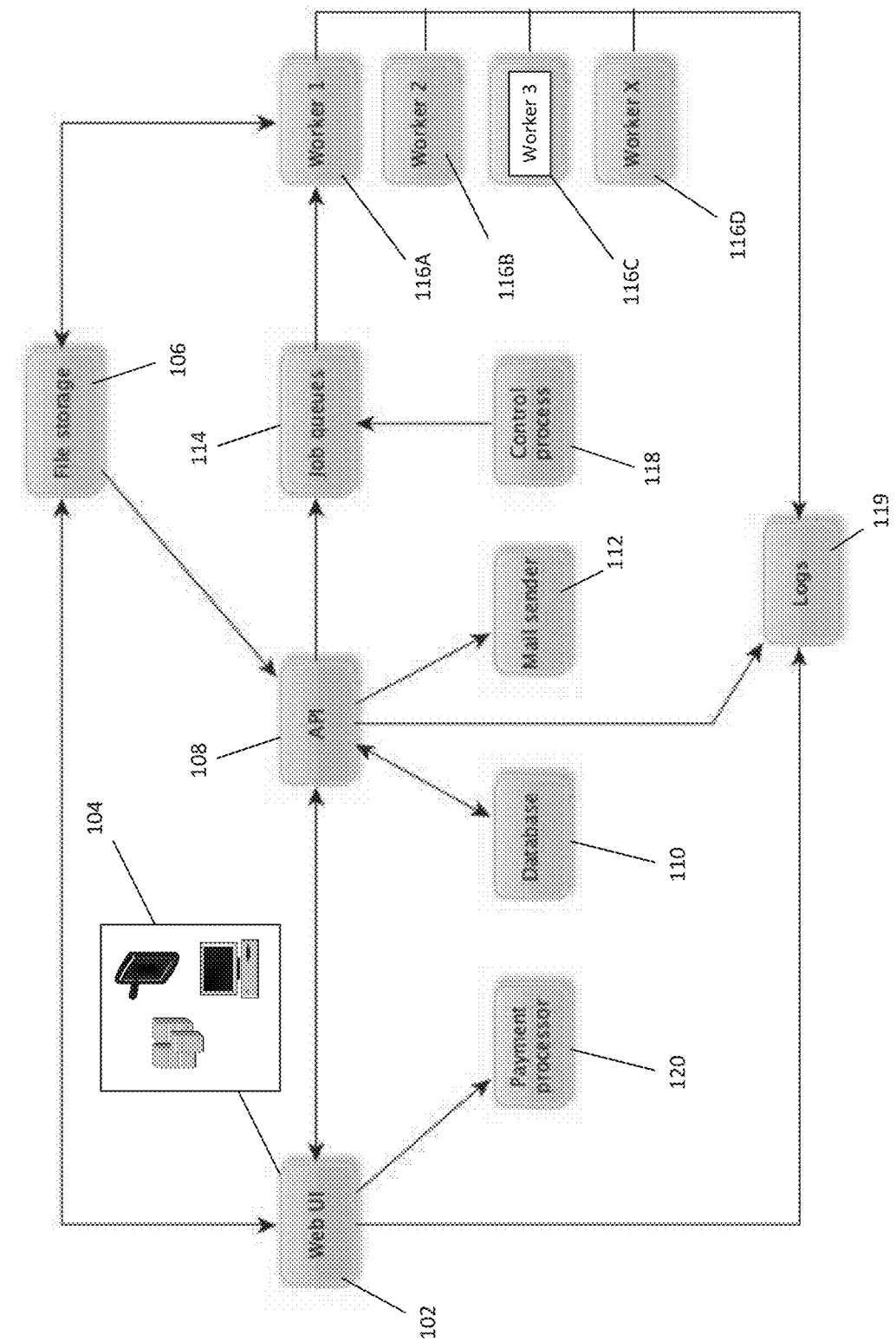
FIGS. 1A and 1B schematically illustrate one example of a computer system and associated process flows for providing a media content mastering platform structured in accordance with various embodiments of the invention.
Figure 1B:
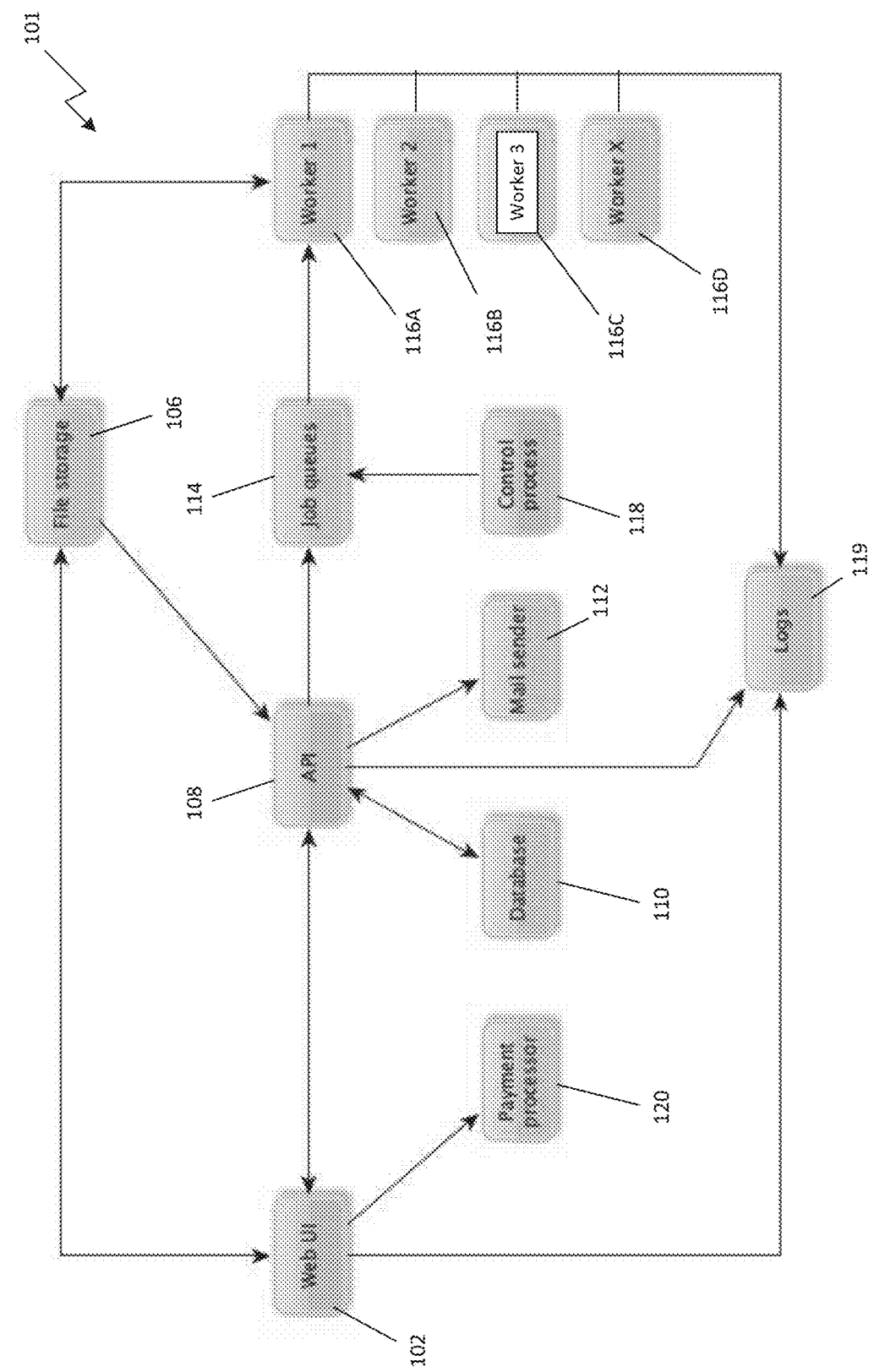
Figure 2:
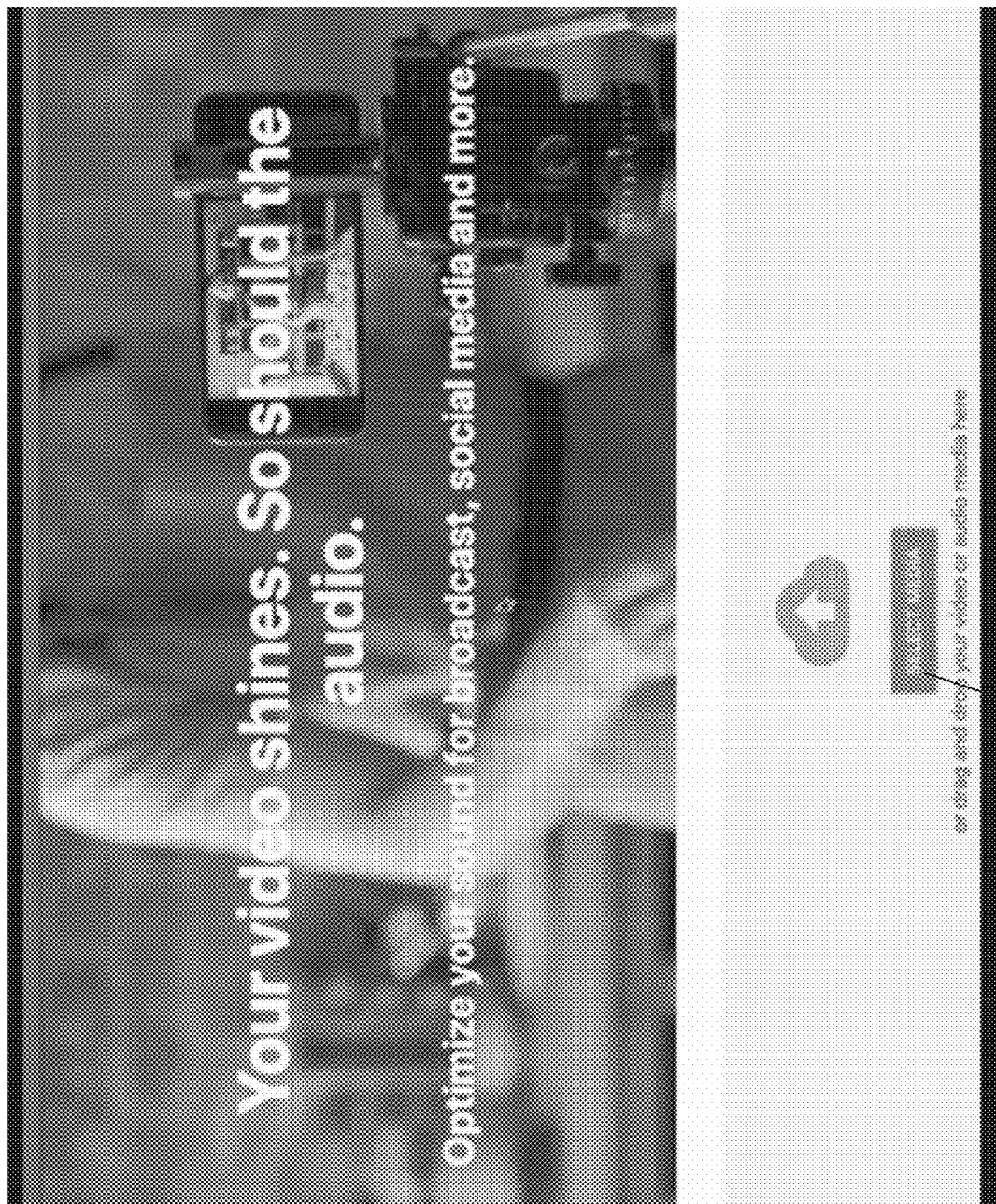
Figure 3:
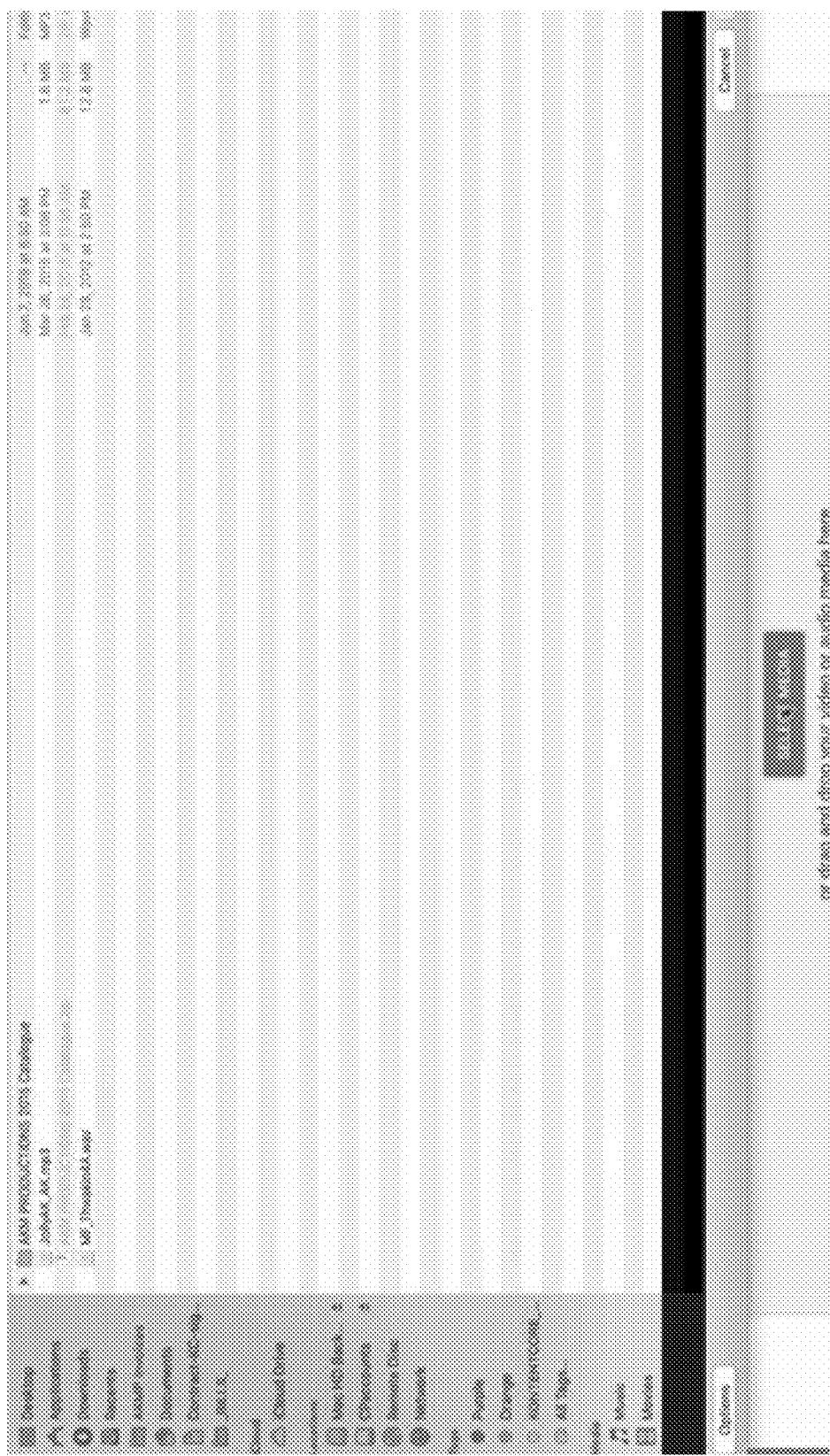
FIG. 3 displays an example of adding original media content files to a media content mastering platform.
Figure 4:
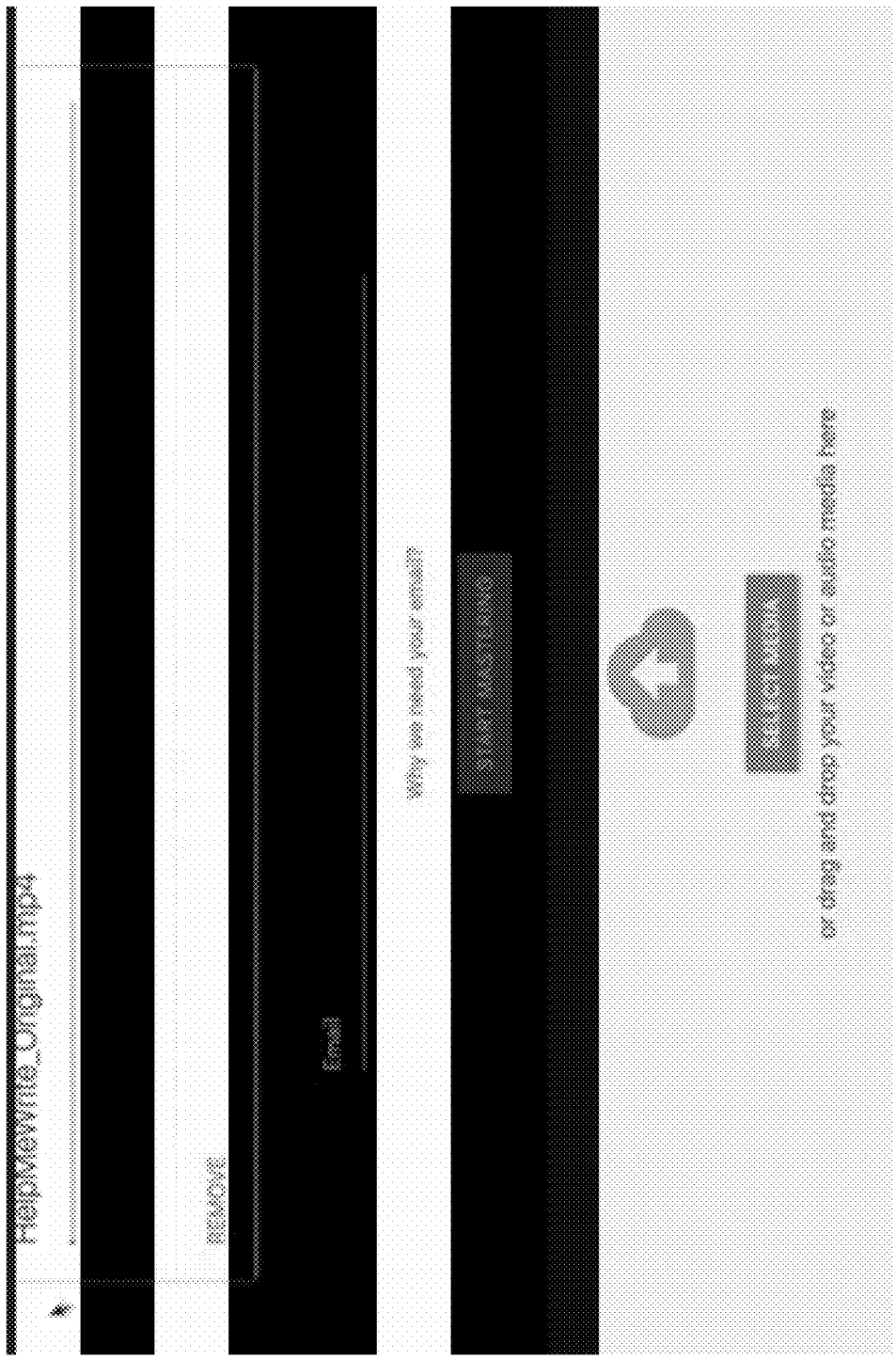
FIG. 4 includes an example of a screen display illustrating a tool for selecting original media content files to be optimized.
Figure 5:
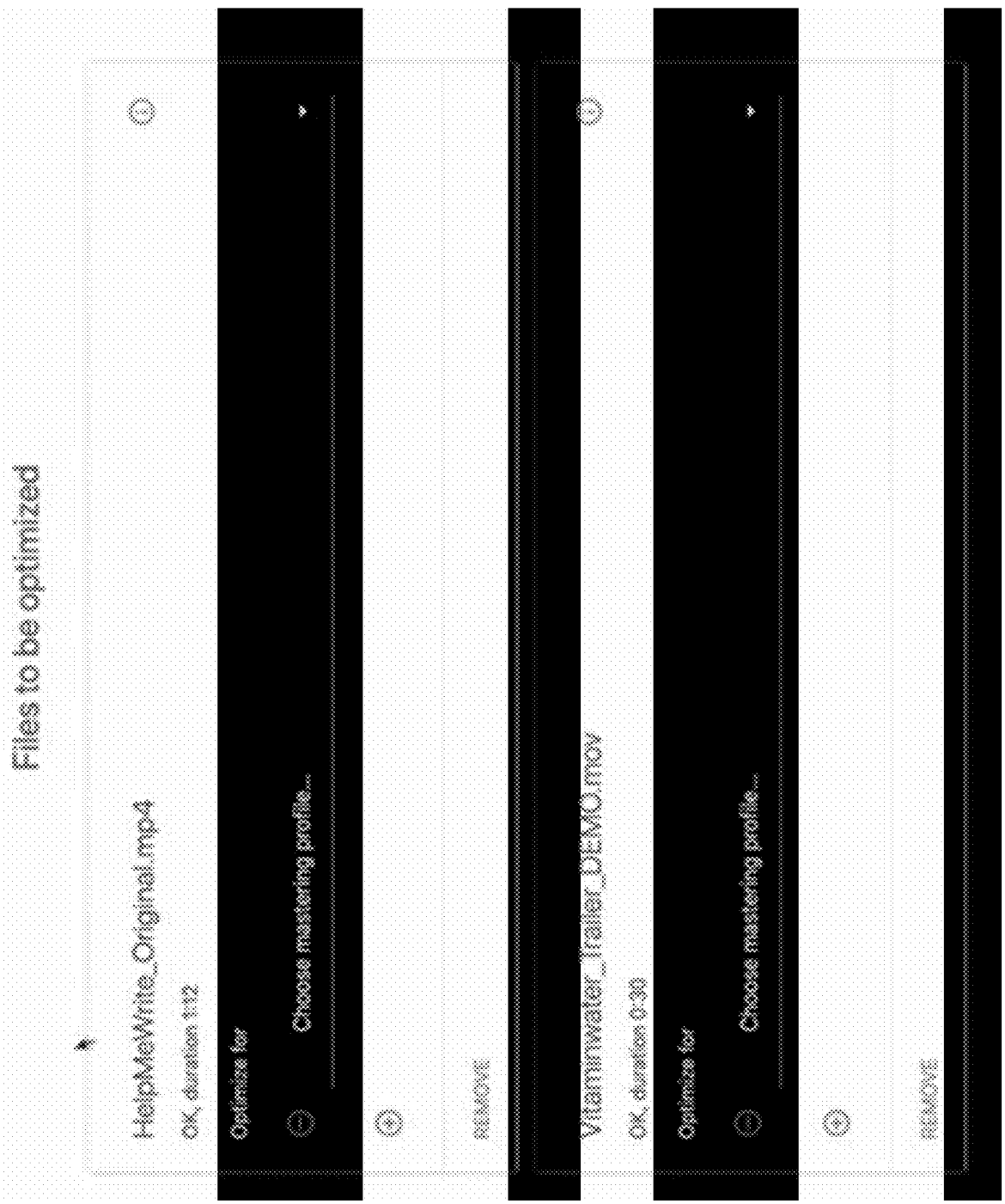
FIG. 5 includes an example of a screen display illustrating a list of original media content files to be optimized.

FIGS. 1A and 1B illustrate an example of a computer system 101 and associated process flows for providing a media content mastering platform structured in accordance with various embodiments of the invention. In this example, a user can access a user interface 102 (e.g., a web-based interface) to load and display a landing page (as shown in the example of FIG. 2) on a user access device 104. By selecting a button 202, for example, the user can add media content files (e.g., audio, video, audiovisual, or other kinds of media content files or content) to the platform, such as from a file directory as shown in the example of FIG. 3. These media content files may be checked by the system 101 directly in the browser, and a determination may be made whether they are of a file type which can be supported by the processing features of the system 101. The media content files to be optimized can be uploaded to file storage 106 directly from the user's browser or interface 102, and then displayed on the access device 104 of the user, for example, as shown in the screen captures of FIG. 4 and FIG. 5 (which shows multiple files uploaded on the same screen display). The media content files can be retrieved from file storage 106 by the user interface 102 to determine whether they are valid, to check format details, to detect duration, and/or to analyze other file attributes or media content. These tasks can be performed when the upload to file storage 106 has been finished for each file, for example, and/or in real-time during the process of communicating data to file storage 106. In various embodiments, the file storage 106 may include a variety of different kinds of electronic computer-readable media or devices.

Figure 6:
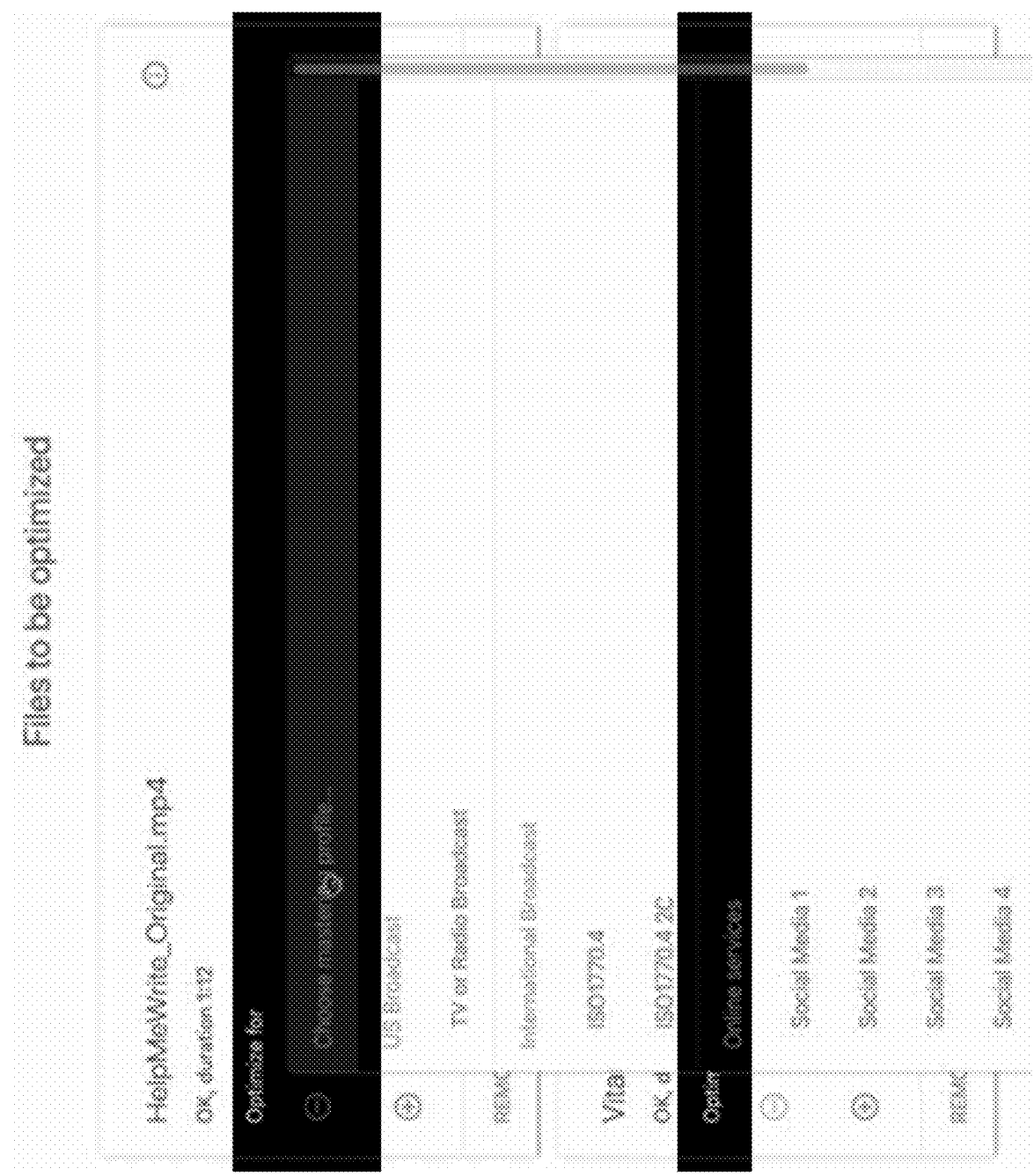
FIG. 6 includes an example of a screen display illustrating multiple currently available mastering profiles.
Figure 7:
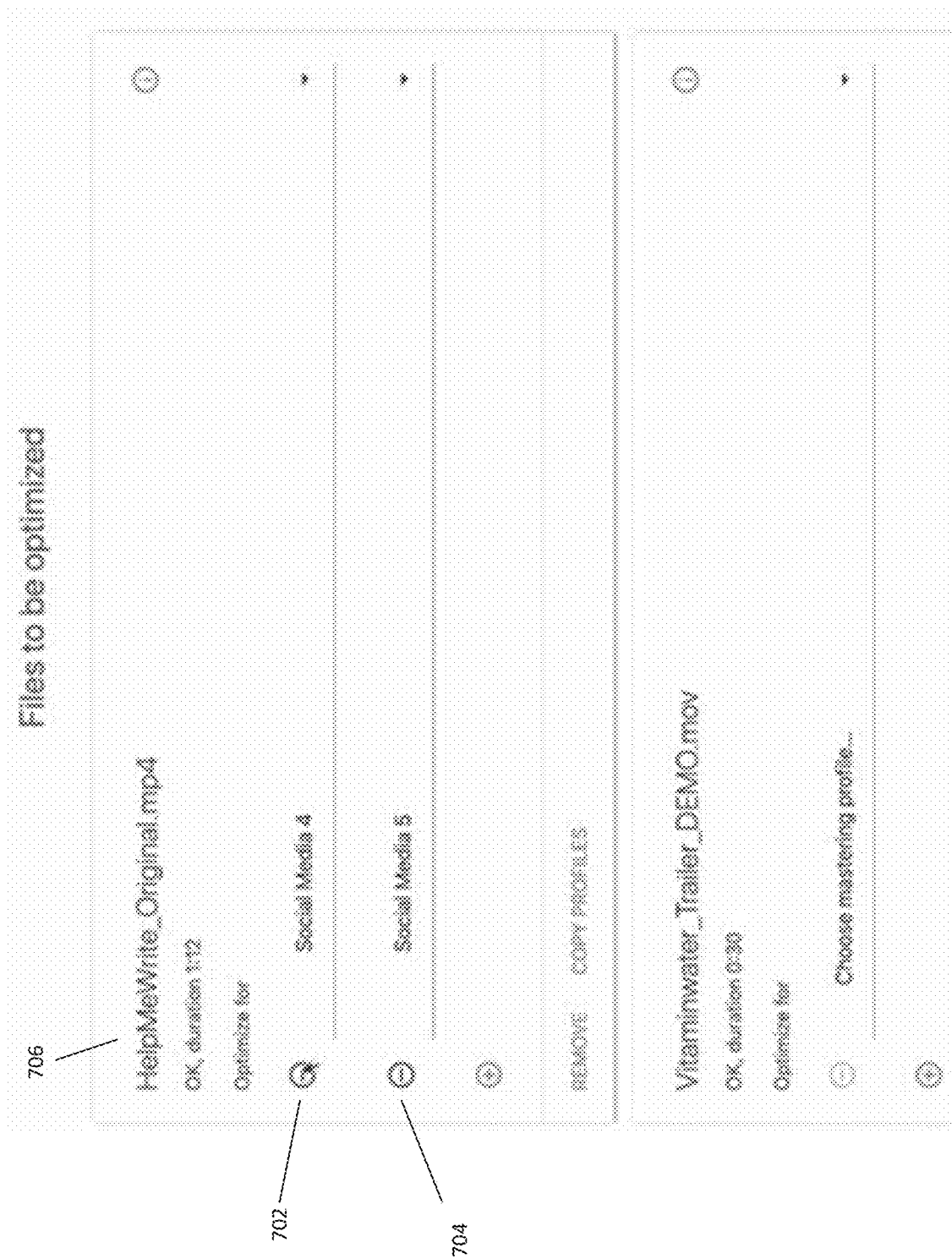
FIG. 7 includes an example of a screen display illustrating how a user has selected multiple mastering profiles for an uploaded media content file.
Figure 8:
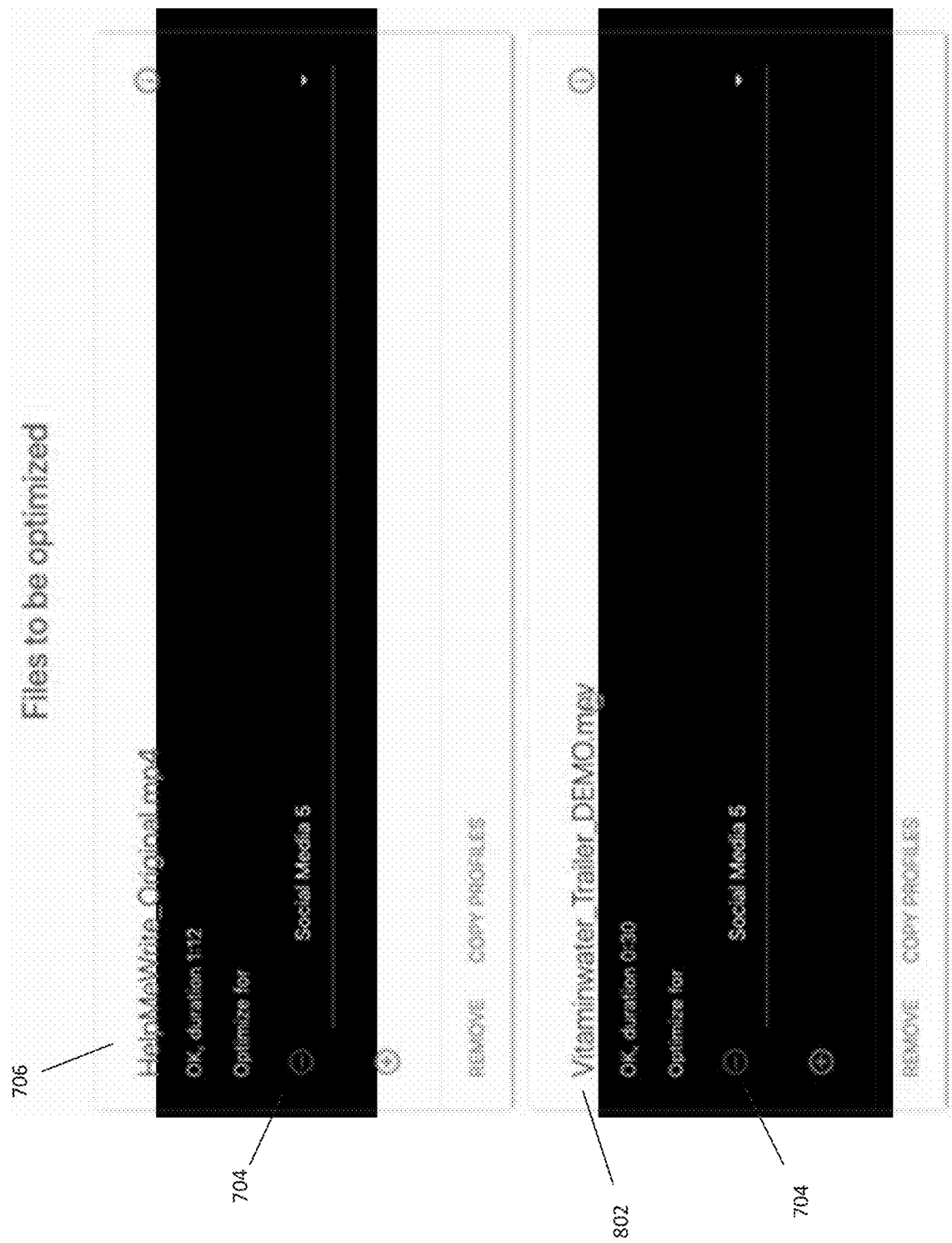
FIG. 8 includes an example of a screen display illustrating how the system can be programmed to facilitate copying a mastering profile between or among different media content files.

With regard to the example shown in FIG. 6, multiple currently available mastering profiles can be read from an application programming interface (API) 108 via the user interface 102. The mastering profiles may comprise audio mastering profiles, for example, or other suitable mastering profiles containing data associated with parameters connected to different characteristics, attributes, or other aspects of media content. The mastering profiles can then be displayed by the system 101 for each media file (if the media file passed all necessary checks, such as the supported file type check described above, and can be effectively processed by the system 101). The audio mastering profiles may include one or more parameter settings that can be applied to a selected media file to alter or enhance one or more aspects of its sound components (e.g., bass, treble, loudness, quality, etc.) As shown in the example of FIG. 7, the user has selected multiple mastering profiles 702, 704, for the uploaded media file 706, perhaps for performing a profile-to-profile comparison across different media content files, for example. FIG. 8 illustrates an example of how the system 101 can be programmed to facilitate copying a mastering profile 704 between or among different media content files 706, 802.

Figure 9:
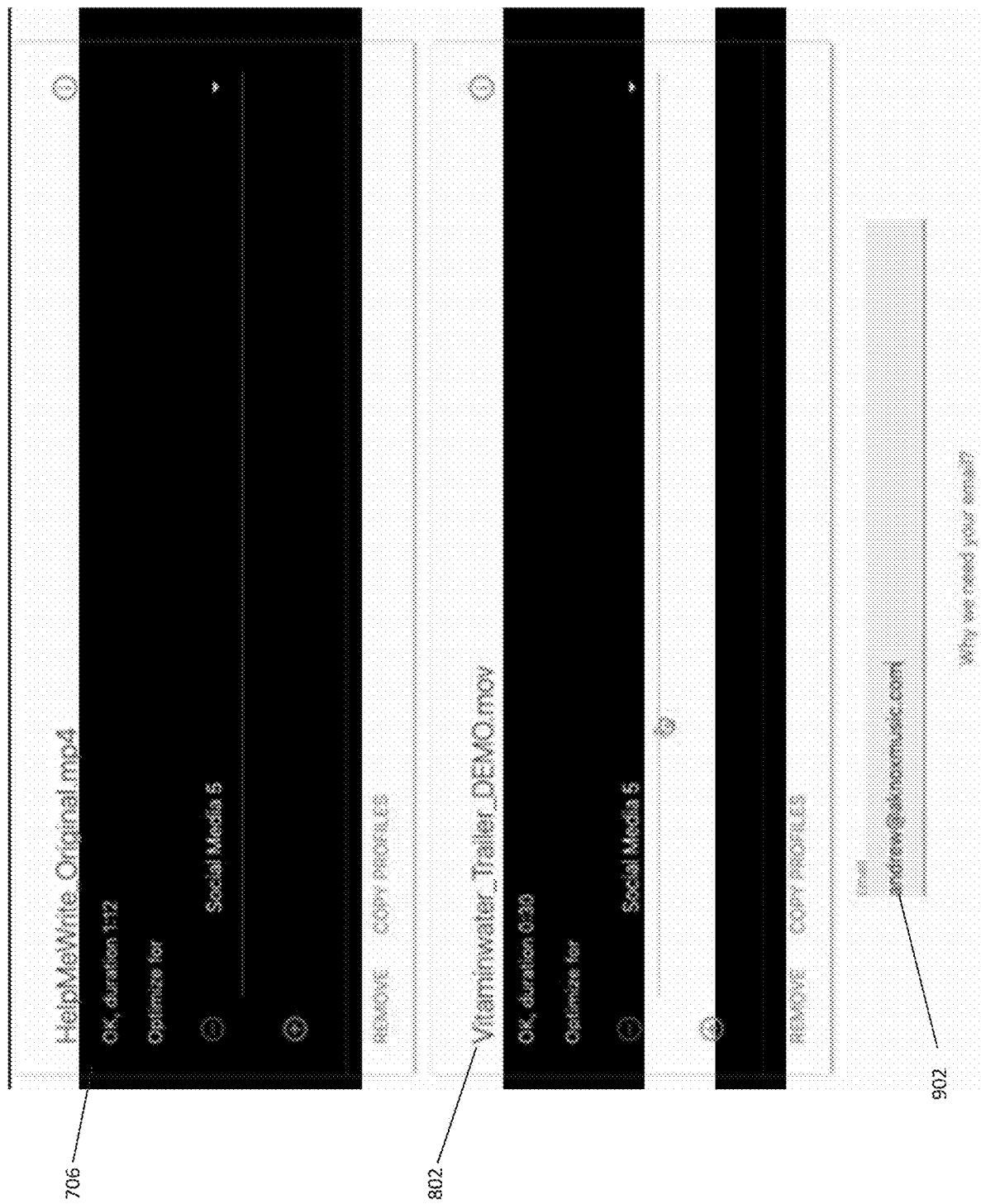
FIG. 9 includes an example of a screen display showing how a user can enter an e-mail address as a means for initiating the remastering process.
Figure 10:
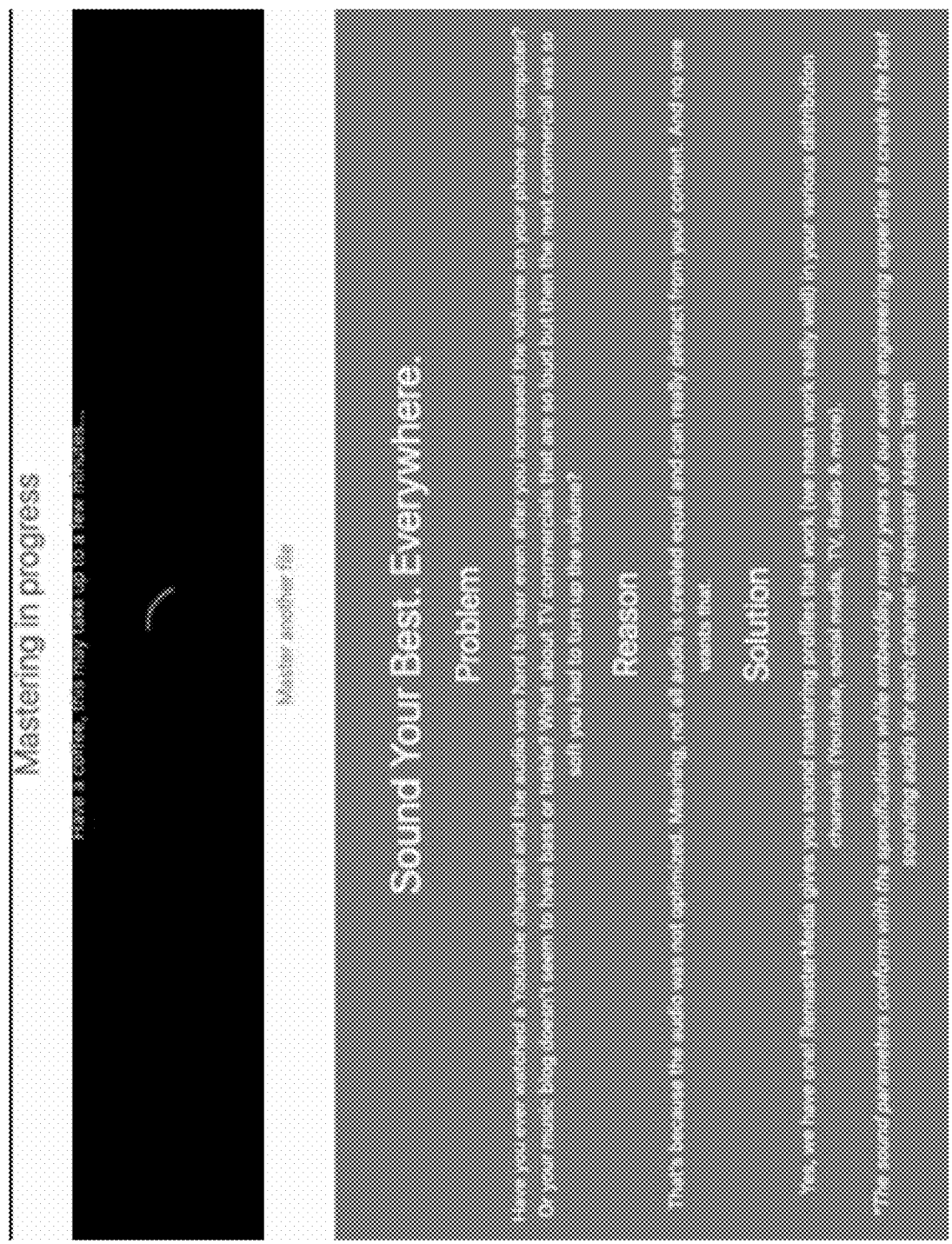
FIG. 10 includes an example of a screen display illustrating a "mastering in progress" message.

FIG. 9 includes an example of how a user can enter an e-mail address 902 as a means for initiating the mastering process. In various embodiments, the mastering process involves the system 101 applying the selected mastering profiles to the uploaded media content files 706, 802 to generate one or more modified or adjusted media content files. With regard to FIG. 10, after the user initiates the mastering tasks through the user interface 102, the screen displays a "mastering in progress" message and several processes can be performed on the content by the system 101. In various embodiments, processing performed by the system 101 may involve one or more computer servers 202, for example, and/or other types of computer processors or computing devices 204 programmed to perform or facilitate the various tasks and features described herein. The user interface 102 can be programmed to monitor via the API 108 whether and when the designated mastering tasks have been completed by the system 101 by checking for the presence of mastered files in the file storage 106, for example.

It can be seen that the user interface 102 can be programmed for creating mastering tasks for appropriate media content files using selected profiles communicated via the API 108. When creating or executing mastering tasks, the API 108 may save information to a database 110 or other data storage media, generate and send email notifications to the user via a mail sender computer component 112, for example, and/or create jobs for each media file and profile in a job queue 114, among other tasks. The job queue 114 can be programmed to deliver job messages to one or more available workers 116A-116D, which comprise computer-implemented modules or other computer components programmed for assisting with preparing modified or adjusted media content by applying mastering profiles to the data stored in the media content file. Among other tasks, the job queue 114 can use a control process 118 (e.g., a module or another set of computer-readable instructions) to monitor and manage how many workers 116 are available for mastering based on the amount of jobs in the job queue 114, to balance workload among the various workers 116A-116D, to determine whether a given job has been started, is in process, or has been completed, and/or other related processing tasks.

In connection with performing mastering tasks, each worker 116 may open and process one or more file streams. In one embodiment, an original audio file can be demultiplexed into individual media streams for further processing, the audio stream can be decoded into raw data, and certain streams can be segregated or discarded. In another embodiment, for an original video file, the video file can be demultiplexed into individual media streams for further processing. In this manner, it can be seen that the video stream and the audio stream can be segregated during the process. In another aspect, a destination file can be created as a final file suitable for receiving the remastered audio content associated with the media content file. The audio and/or video streams can be encoded to the formats and parameters in accordance with mastering profiles selected by the user during the mastering process. The audio and video streams can then be multiplexed or combined together in a manner that reflects the most desirable profile, combination of profiles, or profile parameters as selected by the user.

A preview file with original sound can be created by re-encoding the audio stream in low quality 128k bitrate, for example, to generate the preview format. The video stream (which uses the original file video) can have its resolution scaled, for example, to 640px width and variable height to keep its aspect ratio. The video stream can be kept in the original format, and the audio and video streams can then be multiplexed together. A preview file with remastered sound can be created by re-encoding the audio stream in low quality 128k bit rate, for example, and in accordance with a selected mastering profile or profiles, to generate the preview format. The video stream (which uses the original file video) can have its resolution scaled, for example, to 640px width and variable height to keep its aspect ratio. The video stream is kept in the original format, and the remastered audio stream and the video stream can then be multiplexed or combined together to create a modified or remastered media content file.

In various embodiments, each worker 116 can be programmed to read the data of the original media content file audio stream by portions or segments. With each portion or segment, the worker 116 can perform the following processing (and this processing can be repeated until the entire media file is processed): remasters the portion using the mastering profile (or profiles) selected by the user: and, sends the original file portion and remastered portion to destination file streams, based on whether the destination file uses original sound or remastered sound. Once the destination files have been finished, the worker 116 may set permissions on the preview files to be made available to the user 102. Also, once work has been completed on a media content file (or portion thereof), the worker 116 may be programmed to receive and process another job from the job queue 114. When the entire remastering process is completed for a given job and is detected by the API 108, then this information can be communicated to the user through the user interface 102, for example. In various embodiments, one or more logs 119 may be maintained and stored to reflect processing and tasks performed by the workers 116A-116D and/or other components of the system 101.

Figure 11A:
FIGS. 11A and 11B include examples of screen displays showing how a user can receive a list of files which have now been remastered using selected mastering profiles, and how the user is able to preview them through a user interface.
Figure 11B:
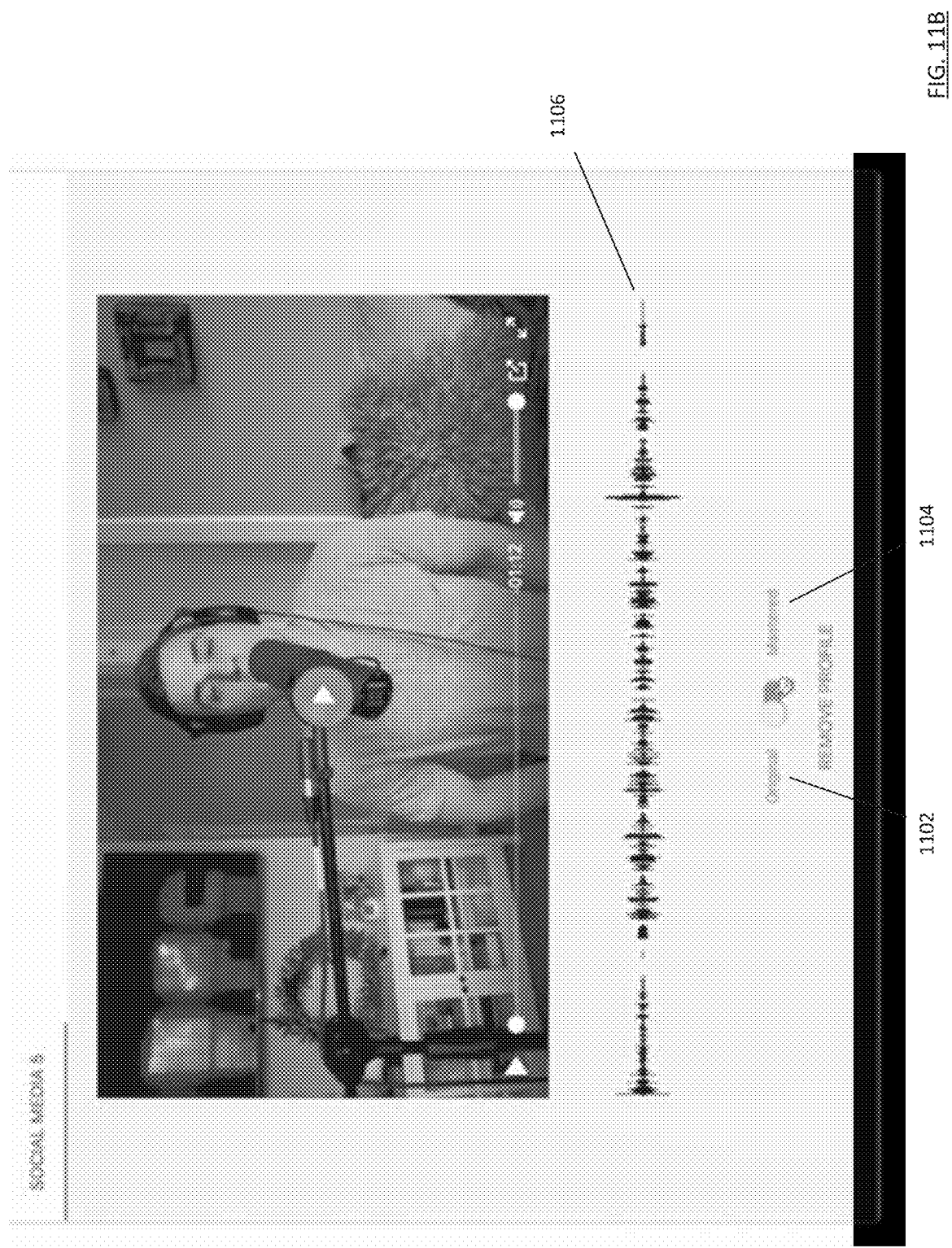
Figure 12A:
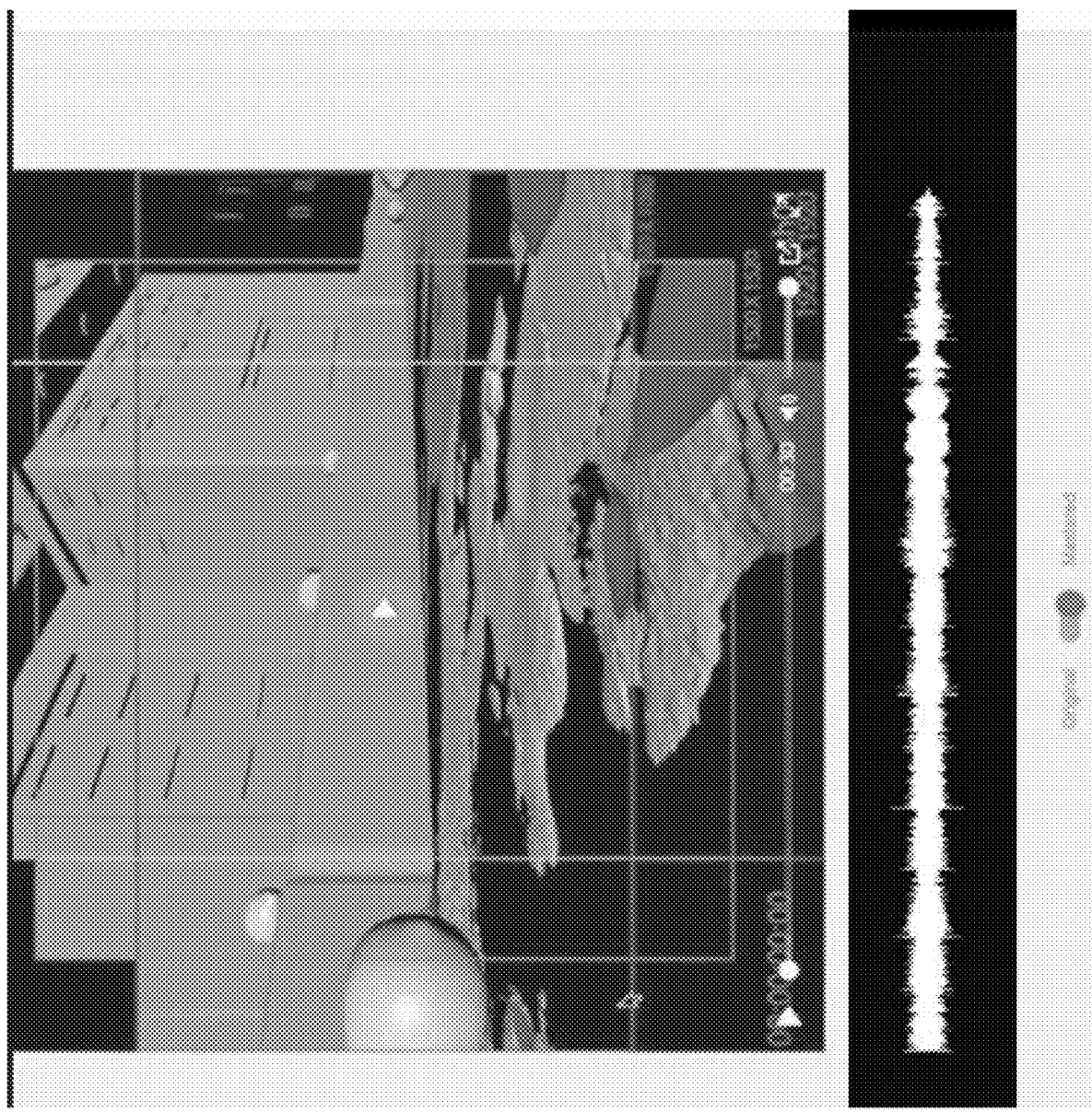
FIG. 12A includes an example of a screen display showing a remastered preview file.
Figure 12B:
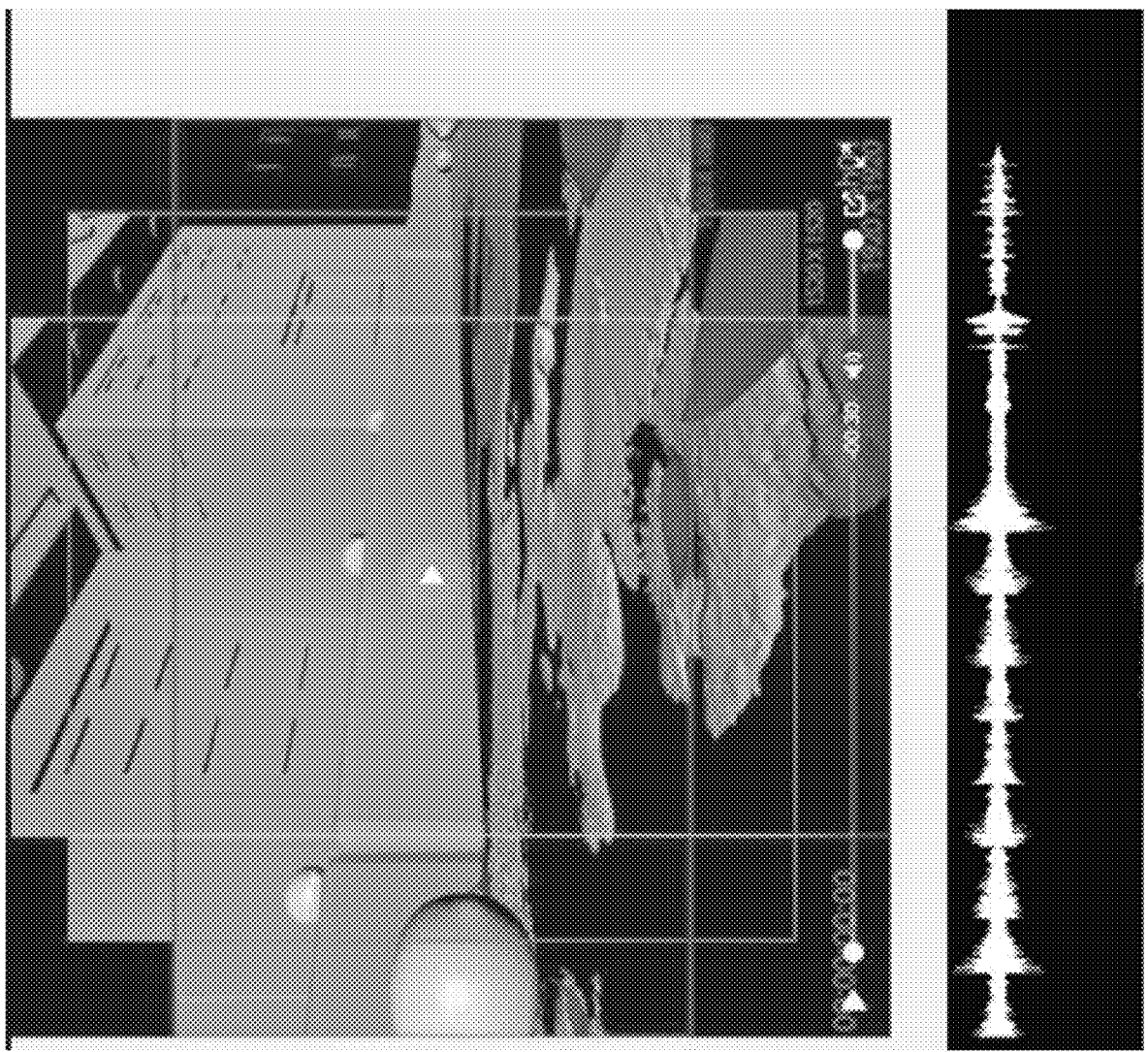
FIG. 12B includes an example of a screen display showing an original preview file.

With regard to the examples illustrated in FIGS. 11A and 11B, the user can receive a list of files which have now been remastered using the selected profiles, and the user is able to preview them through user interface 102. As shown, the user can toggle between an "original" selection 1102 to preview the audio content for a file with original sound (as shown in FIG. 11B), and a "mastered" selection 1104 to preview the audio content of the file with remastered sound (as shown in FIG. 11A). The user can preview the audio content by using the playback tools provided (e.g., play/pause button, mute button, volume control, etc.). In addition, the audio signal associated with each of the original and mastered files can be graphically represented and displayed for the viewer in the form of the wave forms 1106, 1108, as shown. FIGS. 12A and 12B provide other examples of preview files, illustrating both an original preview file (see FIG. 12B) and a remastered preview file (see FIG. 12A).

Figure 13:
FIGS. 13 and 14 schematically illustrate a process for purchasing, downloading, and sharing remastered media content files.
Figure 14:
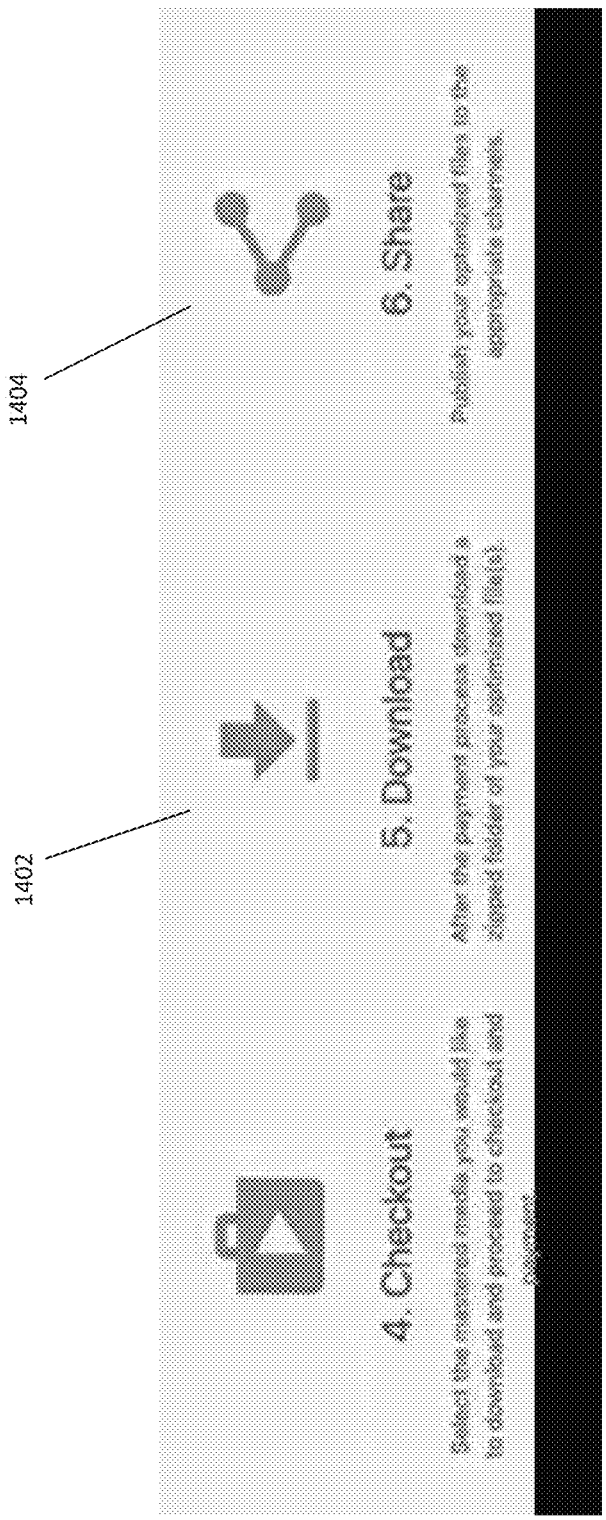
Figure 16:
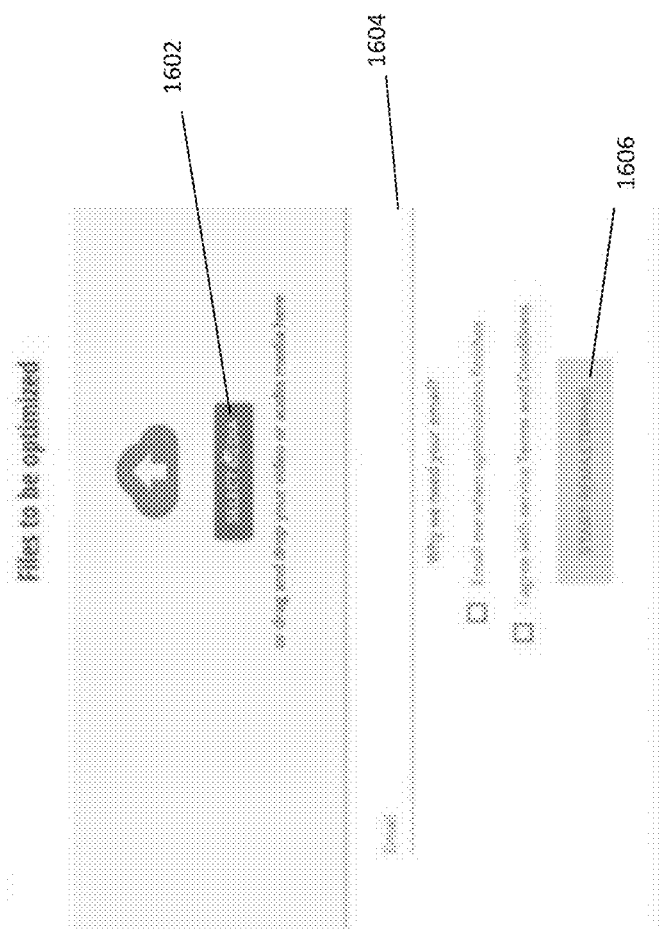

As shown in FIG. 13, the user can make payment for the service by applying a coupon code and/or navigating directly to checkout to process the payment through a computer-based payment processor 120, perhaps with cart and checkout functionality, for example. When payment has been completed, a download link may be communicated to the user to initiate download of final files now incorporating the desired remastered media content (e.g., as a ZIP file) (see FIG. 14). At step 1402, the final files can be downloaded through a suitable data storage method or component as directed by the user. At step 1402, the final files can be shared or communicated through various distribution channels or media outlets as directed and desired by the user.

Figure 1C:
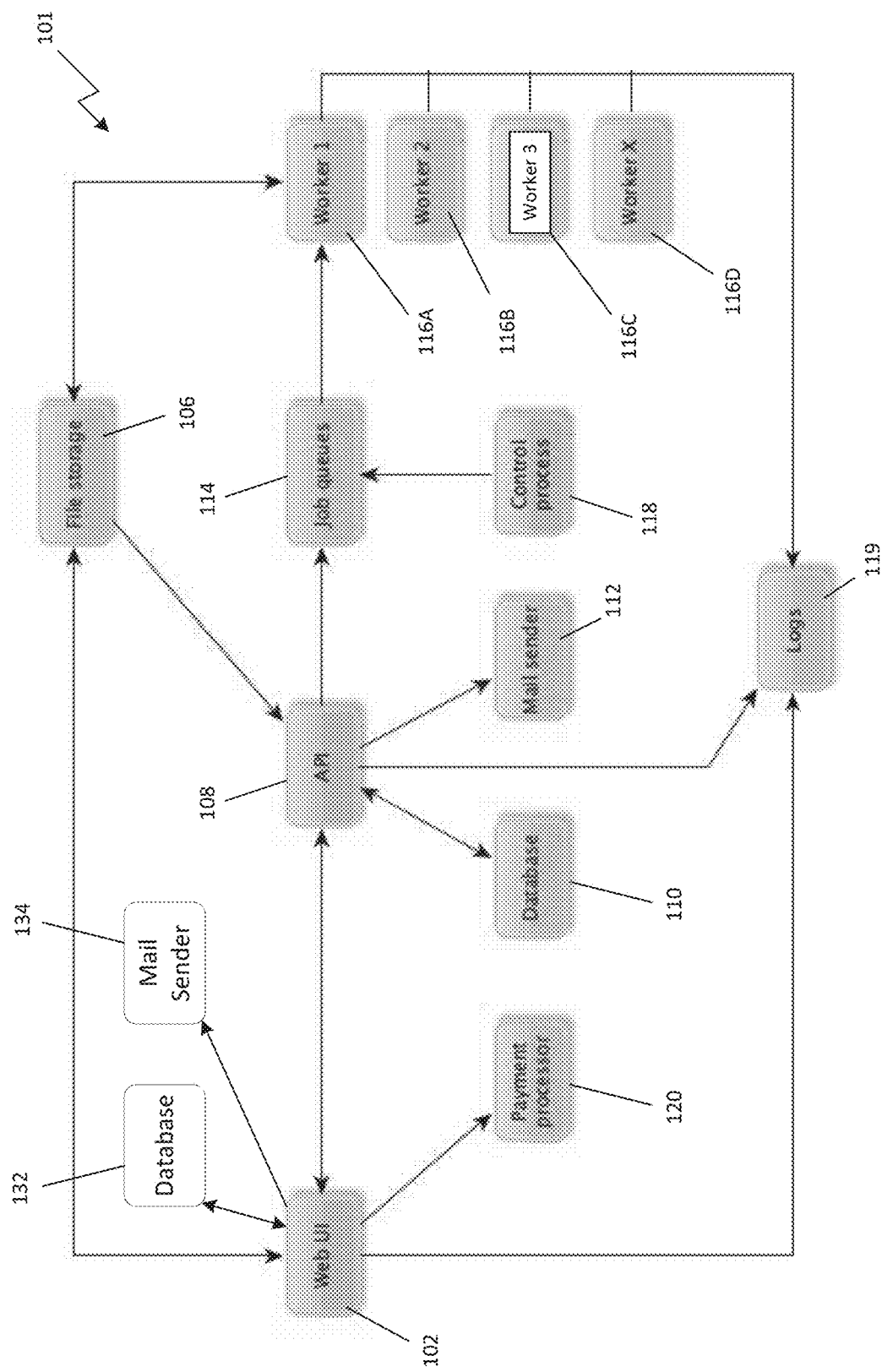
FIG. 1C schematically illustrates another example of a computer system and associated process flows for providing a media content mastering platform structured in accordance with various embodiments of the invention FIG. 2 displays an example of a landing page for a media content mastering platform.

With regard to FIG. 1C, in an alternative embodiment of the system 101, certain user interface functionalities such as discount codes, user account data, and other information associated with specific users may be stored and accessed in connection with a database 132 associated directly with the user interface 102 (e.g., the web-based UI component). In this manner, data and functions associated with the user interface 102 can be processed separately from data and functions associated with the API component 108. Accordingly, tasks and data related to the web-based UI component 102 can be processed in parallel and more efficiently apart from the tasks and data processed by the API component 108. The benefits of such parallel and separate computing functionality can be derived from dedicated database storage (e.g., a database for the API component 108, and a database 132 for the user interface 102), and dedicated e-mail notification capability (e.g., the mail sender 112 for the API component 108, and a mail sender 134 operatively associated with the user interface 102). In one embodiment, the API component 108 primarily handles functionality related to managing remastering jobs, such as data files, remastering profiles, communicating the status of remastering tasks (e.g., pending, in progress, completed, etc.), generating optimized or modified media content (e.g., waveforms, video thumbnails, previews, full-length remasters, etc.). It can be seen that such a distributed, workload-sharing computing architecture can increase the overall processing speed, efficiency, and effectiveness of the system 101.

Figure 17:
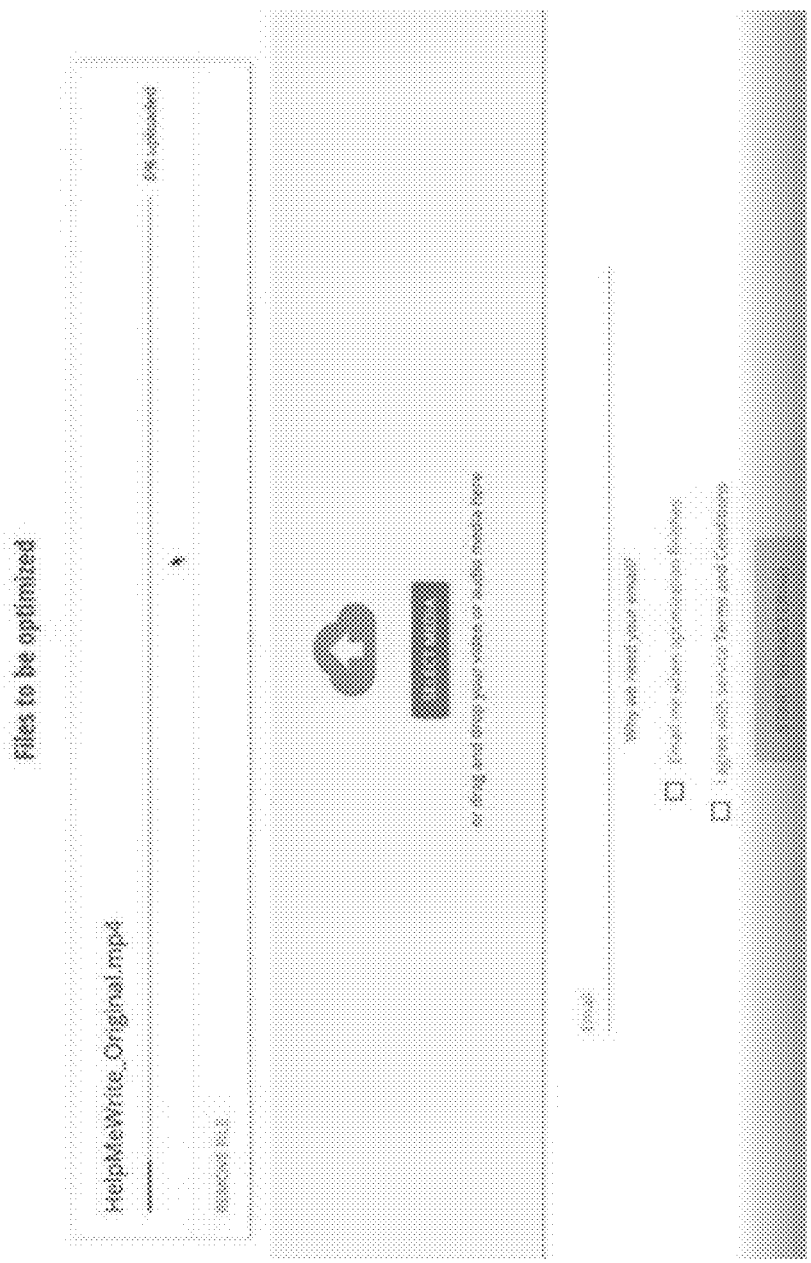

With reference to FIG. 15-FIG. 24, another example is provided of the operation and processing performed by a media content mastering platform configured in accordance with certain embodiments of the invention for optimizing media content. FIG. 15 illustrates an example of an initial screen accessible by the user through the user interface component 102, for example, which allows the user to initiate the process of uploading media content to the system 101 through an access device 104. By using a user interface like the example shown in FIG. 16, the user can select media content from a file directory, for example, or another data source by selecting the button 1602. The user can also specify an e-mail address in data field 1604, which can be used at a later stage by the system 101 to communicate generated content or remastered media content to the user. A "start remastering" button 1606 can then be selected to initiate the next phase of the process of remastering the uploaded media content, which is uploading the selected media content to the system 101 as shown in FIG. 17.

Figure 18:
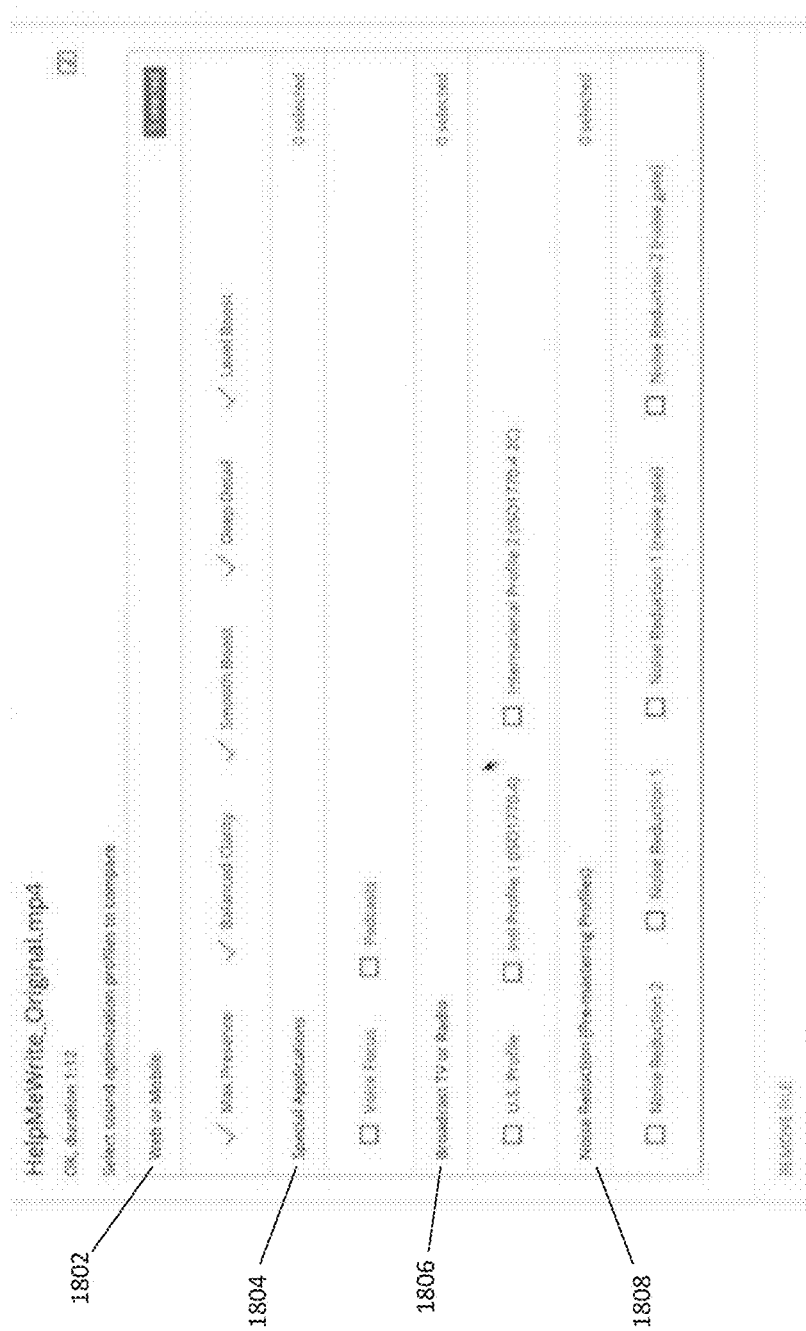

FIG. 18 shows a variety of profiles (e.g., mastering profiles and pre-mastering profiles) which a user can select for the uploaded media content to modify or remaster different aspects of the media content. Those skilled in the art will appreciate that audio content, audio signals, or sounds possess different characteristics or attributes, such as pitch, loudness, and quality, among others. Audio frequency is the rate at which a sound wave completes a cycle from peak, through trough, and then back to peak. Frequency can be considered a different term for pitch. Part of the audio recording, mixing, and mastering (and remastering) processes may involve assembling, shaping, and refining different frequency ranges (pitches) into a consonant (pleasurable) arrangement. Another characteristic of sound is amplitude which can also be considered intensity or volume (e.g., the loudness or softness of the sound).

Sound quality or timbre describes those characteristics of sound which allow the listener to distinguish sounds which have the same pitch and loudness. Timbre can be considered a general term for the distinguishable characteristics of a tone. Timbre is why two different musical instruments can play the same exact note, at the same exact volume, and yet they sound different. Timbre recognizes that sound possesses subtle frequencies (pitches) in addition to a fundamental tone. Some are lower in pitch than the fundamental tone (subtones), and some are higher in pitch than the fundamental tone (overtones). These subtones and overtones collectively can be considered harmonics, and these different harmonics are what can "color" a sound and give the sound certain unique timbres.

An envelope (sometimes referred to as "ADSR envelope") characteristic of sound reflects how sound behaves over time. Envelope can be divided into four separate characteristics. An "attack" characteristic represents how quickly a sound reaches peak volume after the sound is activated. A "slow" attack means that the sound takes a longer time to reach the loudest point, and a "fast" attack means that the sound takes a comparatively shorter time to reach the loudest point. "Decay" addresses how quickly the sound drops to a "sustain" level after the sound hits its peak. Sustain relates to the steady state, constant volume that a sound achieves after decay until the note is released. The "release" characteristic represents how quickly the sound will fade to nothing after a note has ended (e.g., after the key on a musical instrument has been released). Velocity is the speed at which sound travels and it may be affected by different factors such as humidity, density, and temperature. Wavelength is the distance between successive crests of a sound wave. Phase is defined as a location in a given waveform cycle for a sound wave (with 360 degrees representing one complete cycle).

It can be appreciated that selecting one or more different profiles depends a number of factors such as the nature of the media content (e.g., audio or audiovisual), its planned distribution medium or channel (e.g., broadcast channel versus social media channel), the type of access device used to communicate the content (e.g., mobile device versus laptop or notebook computing device), the acoustical environment in which the media content will be communicated (e.g., home setting, large department store, coffee shop, etc.), and/or other factors.

As shown in FIG. 18, various web or mobile profiles 1802 can be provided for selection by the user. In one example, a "Max Presence" mastering profile may involve applying enhanced equalization (EQ) to make sound and music more immersive and engaging to audiences such as for social media channels (e.g., Instagram) or video distribution platforms (e.g., YouTube). Using EQ in music or sound modification is the process of changing the balance of different frequency components in an audio signal. A "Balanced Clarity" mastering profile can provide a balanced EQ level enhancement for music and voice over audio applications, for example. A "Smooth Boost" mastering profile may include a slight EQ enhancement to audio content, such as when a user wants to make a product video more immersive while also keeping distance between music and a voice over used in the video. A "Deep Detail" mastering profile can be employed as a balanced mix in situations where hearing different people engaged in dialogue, for example, is important for the media content. A "Level Boost" profile can be applied to raise the volume level associated with the media content, for example.

In other embodiments, "Special Applications" profiles 1804 can be provided for remastering purposes. For example, a "Voice Focus" profile can be applied to reduce or eliminate background noise and provide clarity to content such as interviews between people, conference calls, voice calls, or for content that will be transcribed by a transcriptionist. In another example, a "Podcast" profile can be used for reducing or eliminating undesirable background noise, especially in situations where recorded voices need to be enhanced or distinguished in the content.

In certain embodiments, different kinds of broadcast television or radio profiles 1806 may be made available for selection by the user. Also, one or more different kinds of "Noise Reduction" profiles 1808 can be applied to the media content, which may occur in a pre-mastering stage before another mastering profile is applied to the content, for example. These "Noise Reduction" profiles 1808 can be used to reduce or eliminate background noise such as microphone hissing or buzzing.

Figure 19:
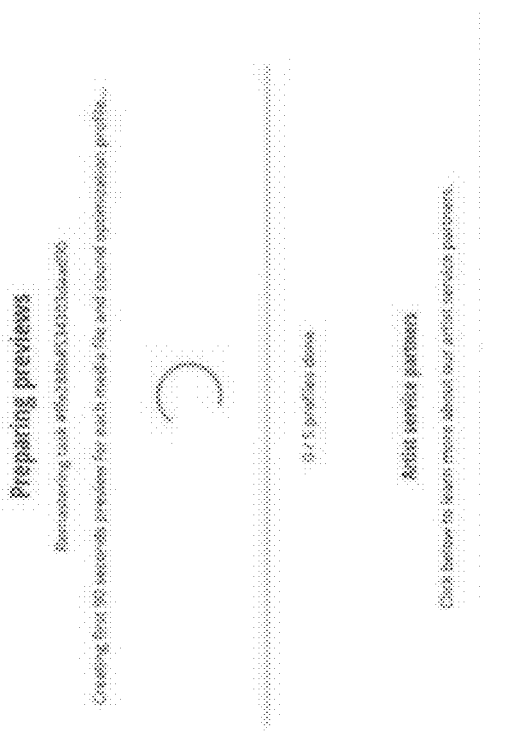
Figure 20:
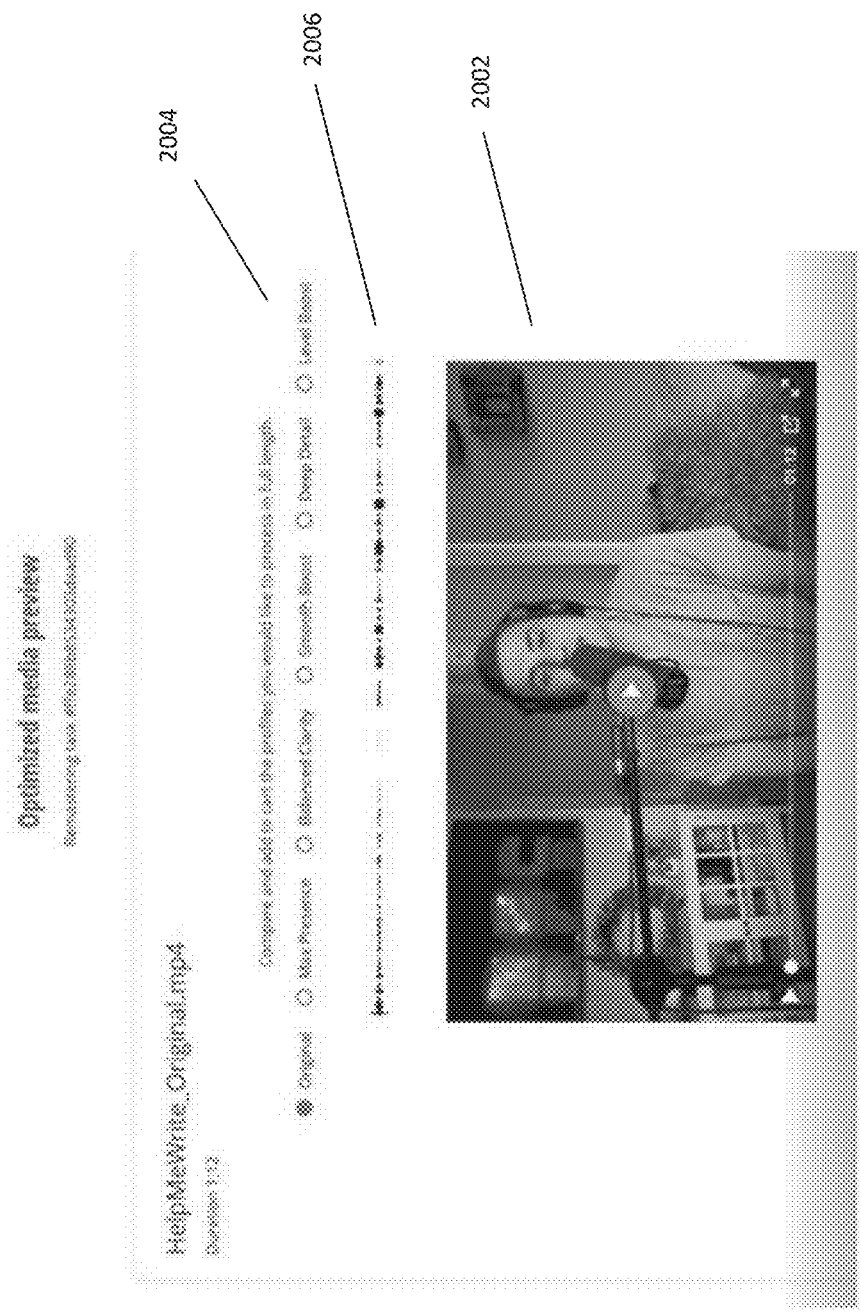

After a desired remastering selection or selections have been made by the user, FIG. 19 illustrates the system 101 in the process of generating media content using the selected profiles. FIG. 20 depicts an optimized media preview screen in which the user can view the now remastered or optimized media content 2002. As shown, the user may selection one or more options 2004 for previewing the content, as remastered or optimized by a variety of different profiles, including reviewing the media content in its original pre-mastered form. It can be appreciated how this facilitates a comparison of the original content versus the remastered or optimized content in the context of a variety of different profiles. A visual representation of the audio signal 2006 associated with each preview version of the media content can also be displayed on this preview screen to enhance understanding of the remastered or optimized content.

Figure 21:
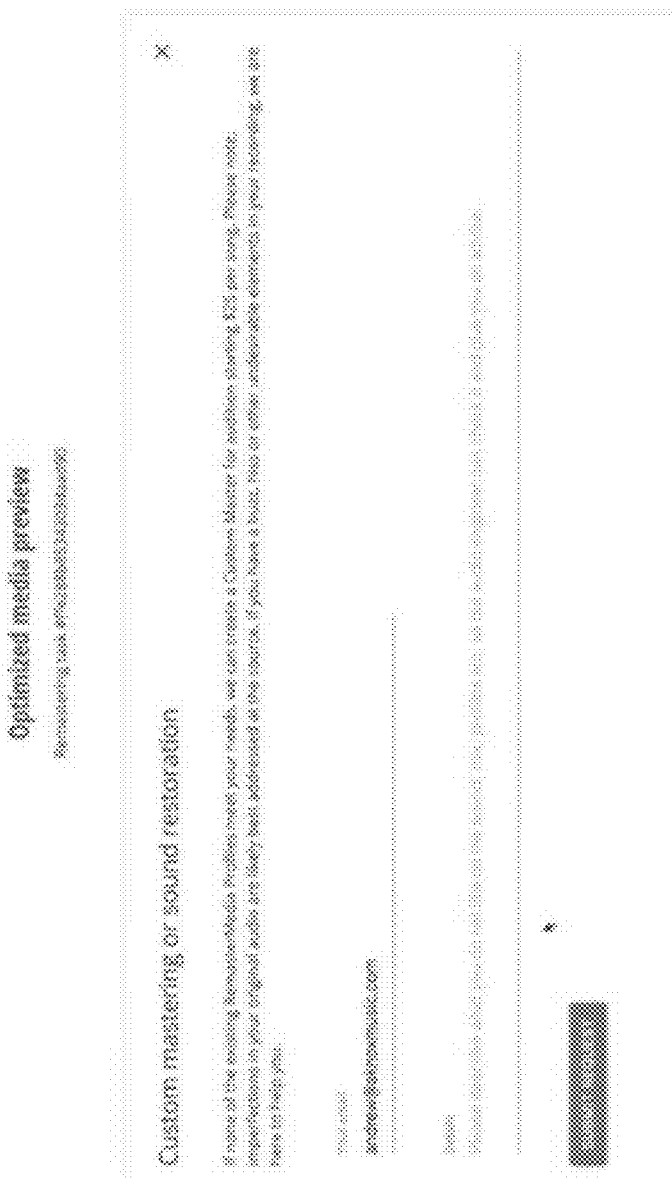
Figure 22:
Figure 23:
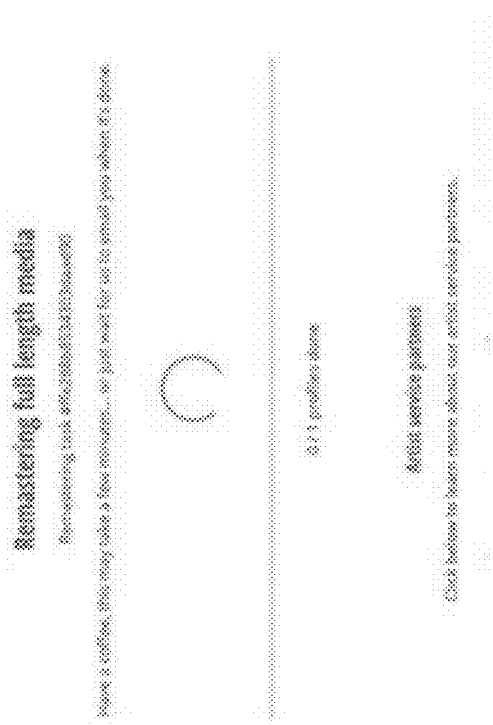
Figure 24:
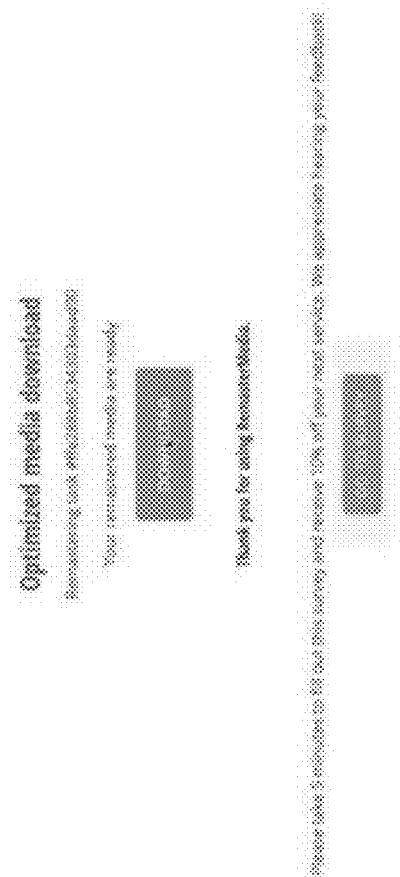

FIG. 21 illustrates an example of how other profiles or optimization techniques can be customized as may be desired by the user. FIG. 22 illustrates an example of processing payment for the remastered versions of the media content selected for purchase by the user. FIG. 23 illustrates an example of the system 101 processing the entirety of the media content in accordance with the profiles previewed, selected, and purchased by the user. FIG. 24 shows an example of making the remastered or optimized media content available for download to a storage location determined by the user.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular features illustrated by the examples of system architectures, configurations, data definitions, screen displays, graphical representations, or process flows described herein are necessarily intended to limit the scope of the invention, unless such features are specifically recited in the claims.

Any element expressed herein as a means for performing a specified function is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, various models or platforms can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

In certain embodiments, the invention may employ optical character recognition (OCR) technology, such as to capture data and other information from documents scanned by different components of the platform. This OCR technology may be derived from conventional OCR techniques, customized OCR technology (i.e., modified for the current platform solution), and/or some combination thereof.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. Wireless communications described herein may be conducted with Wi-Fi and Bluetooth enabled networks and devices, among other types of suitable wireless communication protocols. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to conduct the traffic of different user communities separately and securely over an underlying network. The VPN may provide users with the virtual experience of accessing the network through an IP address location other than the actual IP address which connects the wireless device to the network. The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a processor or application specific processor.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. Discrete components and features may be readily separated from or combined with the features of any of the other several aspects without departing from the scope of the present disclosure. Any recited method can be carried out in the order of events recited or in any other order which is logically possible.

Unless specifically stated otherwise, it may be appreciated that terms such as "processing," "computing," "calculating," "determining," or the like, refer to the action and/or processes of a computer or computing system, or similar electronic computing device, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments of the present invention may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by hardware as discussed above, as an alternative the same may also be embodied in dedicated hardware or a combination of software/hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flow charts and methods described herein show the functionality and operation of various implementations. If embodied in software, each block, step, or action may represent a module, segment, or portion of code that comprises program instructions to implement the specified logical functions. The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical functions.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as" or "for example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

What is claimed is:

1. A system for modifying media content, the system comprising:
    an application programming interface programmed for:
        communicating one or more selected optimizing profiles to a user interface, and
        instructing a control process programmed for executing at least one job associated with applying the optimizing profiles to one or more uploaded original media content files;
    at least one worker programmed for separating uploaded media content file into an audio component portion and a video component portion;
    at least one worker programmed for applying the selected optimizing profiles to at least the audio component portion to generate an optimized audio component portion, wherein at least one optimizing profile comprises:
        an audio mastering profile including one or more parameter settings configured for application to a selected media file to alter or enhance one or more aspects of sound components of the selected media file for optimizing at least a portion of the selected media file, and
        the audio mastering profile configured for optimizing at least a portion of the selected media file in response to a type of access device to be used to communicate the media content;
    at least one worker programmed for combining the video component portion with the optimized audio component portion to generate at least one modified media content file; and the user interface programmed for:
facilitating selection of one or more of the original media content files for electronic upload from an access device, at least a portion of the selected media content files comprising audio content,
reading from the application programming interface, by an electronic computer processor, multiple available optimizing profiles,
displaying the available optimizing profiles in connection with the selected media content files,
receiving selection of at least one optimizing profile,
receiving, from the application programming interface, the modified media content file, and
in combination, providing user access for both:
previewing the original media content file, and
previewing the modified media content file associated with the original media content file.

2. The system of claim 1, further comprising a toggle switch for changing between the original media content file and a modified media content file including at least one optimized portion.

3. The system of claim 1, further comprising the user interface configured with at least one playback tool for previewing at least a portion of the modified media content file.

4. The system of claim 1, further comprising the user interface programmed for graphically representing at least a portion of an audio signal associated with the original media content file.

5. The system of claim 1, further comprising the user interface programmed for graphically representing at least a portion of an audio signal associated with the modified media content file.

6. The system of claim 1, further comprising:
the application programming interface programmed for:
separating multiple uploaded media content files into respective audio component portions and video component portions,
applying the same selected mastering profile to at least the audio component portions to generate optimized audio component portions, and
combining the video component portions with their associated optimized audio component portions to generate multiple modified media content files; and
the user interface programmed for receiving, from the application programming interface, the modified media content files.

7. The system of claim 6, further comprising the user interface programmed for previewing the modified media content files.

8. The system of claim 1, further comprising:
the application programming interface programmed for:
separating multiple uploaded media content files into respective audio component portions and video component portions,
applying multiple selected mastering profiles to at least the audio component portions to generate optimized audio component portions, and
combining the video component portions with their associated optimized audio component portions to generate multiple modified media content files; and
the user interface programmed for receiving, from the application programming interface, the modified media content files.

9. The system of claim 8, further comprising the user interface programmed for previewing the multiple modified media content files.

10. The system of claim 9, further comprising the user interface programmed for performing a profile-to-profile comparison across a plurality of the multiple modified media content files.

11. The system of claim 1, further comprising the user interface programmed for facilitating copying a selected mastering profile between or among multiple different media content files.

12. The system of claim 1, further comprising a job queue in communication with the application programming interface, the job queue programmed to deliver at least one job message to at least one available worker for applying at least one mastering profiles to data associated with the original media content file.

13. The system of claim 12, further comprising the job queue programmed for using a control process for managing a plurality of workers in response to an amount of jobs in the job queue.

14. The system of claim 12, further comprising the job queue programmed for using a control process for balancing a job workload among multiple workers.

15. The system of claim 12, further comprising the job queue programmed for using a control process for monitoring:
whether a selected job has been started,
whether the selected job is in process, or
whether the selected job has been completed.

16. A system for modifying media content, the system comprising:
an application programming interface programmed for:
communicating one or more selected optimizing profiles to a user interface, and
instructing a control process programmed for executing at least one job associated with applying the optimizing profiles to one or more uploaded original media content files;
at least one worker programmed for separating uploaded media content file into an audio component portion and a video component portion;
at least one worker programmed for applying the selected optimizing profiles to at least the audio component portion to generate an optimized audio component portion, wherein at least one optimizing profile comprises a distribution medium profile configured for optimizing at least a portion of the selected media file in response to a planned distribution medium or distribution channel for communicating the media content;
at least one worker programmed for combining the video component portion with the optimized audio component portion to generate at least one modified media content file; and
the user interface programmed for:
facilitating selection of one or more of the original media content files for electronic upload from an access device, at least a portion of the selected media content files comprising audio content,
reading from the application programming interface, by an electronic computer processor, multiple available optimizing profiles,
displaying the available optimizing profiles in connection with the selected media content files,
receiving selection of at least one optimizing profile,
receiving, from the application programming interface, the modified media content file, and
in combination, providing user access for both:
previewing the original media content file, and previewing the modified media content file associated with the original media content file.

17. A system for modifying media content, the system comprising:

an application programming interface programmed for:
communicating one or more selected optimizing profiles to a user interface, and
instructing a control process programmed for executing at least one job associated with applying the optimizing profiles to one or more uploaded original media content files;

at least one worker programmed for separating uploaded media content file into an audio component portion and a video component portion;

at least one worker programmed for applying the selected optimizing profiles to at least the audio component portion to generate an optimized audio component portion, wherein at least one optimizing profile comprises an acoustical environment profile configured for optimizing at least a portion of the selected media file in response to at least one acoustical characteristic of an environment in which the media content is to be communicated;

at least one worker programmed for combining the video component portion with the optimized audio component portion to generate at least one modified media content file; and the user interface programmed for:
facilitating selection of one or more of the original media content files for electronic upload from an access device, at least a portion of the selected media content files comprising audio content,
reading from the application programming interface, by an electronic computer processor, multiple available optimizing profiles,
displaying the available optimizing profiles in connection with the selected media content files,
receiving selection of at least one optimizing profile,
receiving, from the application programming interface, the modified media content file, and
in combination, providing user access for both:
previewing the original media content file, and
previewing the modified media content file associated with the original media content file.

18. A system for modifying media content, the system comprising:

an application programming interface programmed for:
communicating one or more selected optimizing profiles to a user interface, and
instructing a control process programmed for executing at least one job associated with applying the optimizing profiles to one or more uploaded original media content files;

at least one worker programmed for separating uploaded media content file into an audio component portion and a video component portion;

at least one worker programmed for applying the selected optimizing profiles to at least the audio component portion to generate an optimized audio component portion, wherein at least one optimizing profile comprises a noise reduction profile programmed for reducing or eliminating background noise in the media content and for providing enhanced clarity for the media content;

at least one worker programmed for combining the video component portion with the optimized audio component portion to generate at least one modified media content file; and the user interface programmed for:
facilitating selection of one or more of the original media content files for electronic upload from an access device, at least a portion of the selected media content files comprising audio content,
reading from the application programming interface, by an electronic computer processor, multiple available optimizing profiles,
displaying the available optimizing profiles in connection with the selected media content files,
receiving selection of at least one optimizing profile,
receiving, from the application programming interface, the modified media content file, and
in combination, providing user access for both:
previewing the original media content file, and
previewing the modified media content file associated with the original media content file.

* * * * *